(12) United States Patent
Tada et al.

(10) Patent No.: US 6,221,930 B1
(45) Date of Patent: Apr. 24, 2001

(54) SHOCK ABSORBER

(75) Inventors: Shin Tada; Tatsuo Yata; Keiichiro Tabata; Yoichi Nabeshima, all of Kanagawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/357,820

(22) Filed: Jul. 20, 1999

(30) Foreign Application Priority Data

| Jul. 23, 1998 | (JP) | 10-207993 |
| Nov. 13, 1998 | (JP) | 10-323754 |
| Jun. 30, 1999 | (JP) | 11-185999 |

(51) Int. Cl.$^7$ .................................................. C08G 18/10
(52) U.S. Cl. .................... 521/155; 248/560; 248/615; 248/634; 293/102; 293/120; 293/132; 428/423.1; 521/50; 521/174

(58) Field of Search ........................ 521/50, 155, 174; 248/560, 615, 634; 293/102, 120, 132; 428/423.1

(56) References Cited

U.S. PATENT DOCUMENTS

| 4,668,555 | * | 5/1987 | Uekado et al. | 428/69 |
| 5,575,871 | * | 11/1996 | Ryoshi et al. | 156/78 |
| 6,057,378 | * | 5/2000 | Perstnev et al. | 521/155 |

* cited by examiner

*Primary Examiner*—John M. Cooney, Jr.
(74) *Attorney, Agent, or Firm*—Kanesaka & Takeuchi

(57) ABSTRACT

A lightweight shock absorber has an ideal F-S waveform, and is formed of a foam resin material. The cross-sectional area of the absorber in the compression axis direction and the vertical direction changes at least partially in the compression axis direction, and consequently the relation between distortion and compressive stress in the compression axis direction (F-S waveform) is approximately linear.

20 Claims, 11 Drawing Sheets

SHOCK ABSORBER

BACKGROUND OF THE INVENTION

1. Field of the Invention

The present invention relates to a shock absorber, and more particularly relates to a shock absorber which is ideal as a shock absorbing pad incorporated in a door trim, center pillar trim, and the like, incorporated inside a vehicle, for absorbing a shock received by a passenger when the vehicle suffers a collision.

2. Description of the Related Art

To absorb a shock which a passenger receives in the upper torso during a vehicular collision, a shock absorbing material must exhibit stress which is linear with respect to the compression stroke (compressive distortion). That is, the material should have an F-S waveform (force-stroke waveform) wherein the stress is proportional to the compression stroke. Conventionally, an iron plate, semi-rigid polyurethane foam, and the like have been used in many cases as materials having this sort of a linear F-S waveform.

Figure 2A:
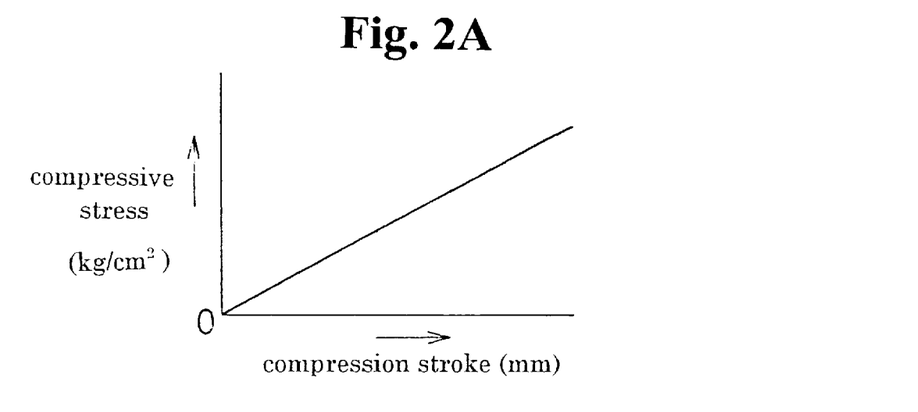
FIG. 2A to FIG. 2C are graphs showing F-S waveforms of various types of material.

However, although an iron plate, one of the conventionally used shock absorbing materials, has a linear F-S waveform as shown in FIG. 2A, it has a drawback in that it is heavy and consequently increases the weight of the vehicle.

Figure 2B:
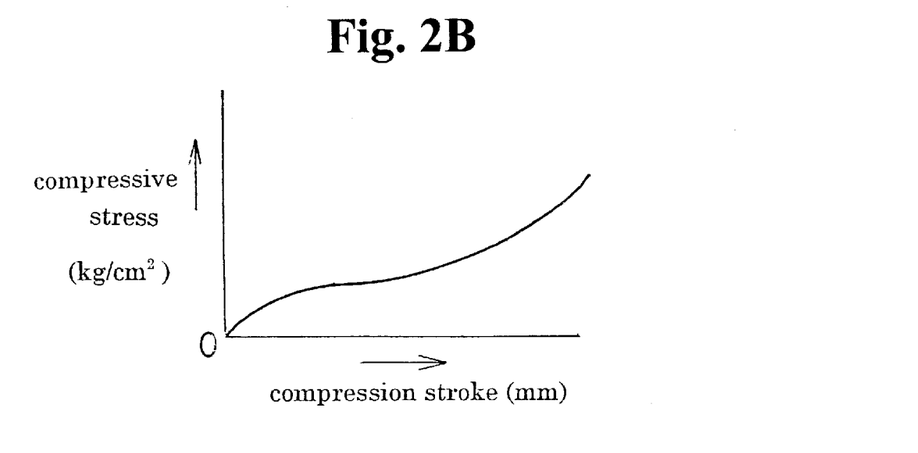

On the other hand, semi-rigid polyurethane foam has the F-S waveform shown in FIG. 2B, which has a drawback in that the F-S waveform is linear only during the initial period of compression (when the compression stroke is small), and deviates from the required waveform when the compression stroke increases.

Figure 2C:
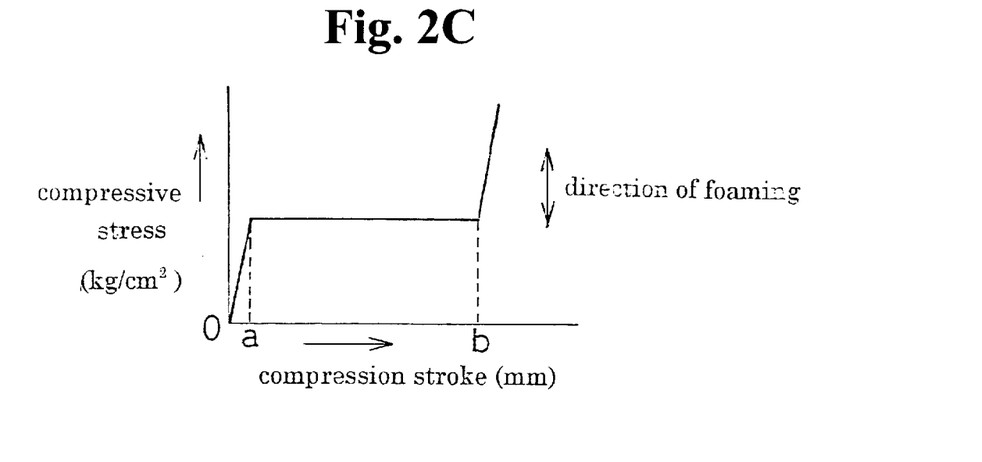

Rigid polyurethane foam is generally used as a buffer material, but even a rigid polyurethane foam with a low level of hardness, having a compressive stress of approximately 3.0 kg/cm$^2$, or a rigid polyurethane foam with a high level of hardness, having a compressive stress of approximately 8.0 kg/cm$^2$, has a waveform which deviates considerably from the required waveform, as shown schematically by the F-S waveform of FIG. 2C.

Figure 8:
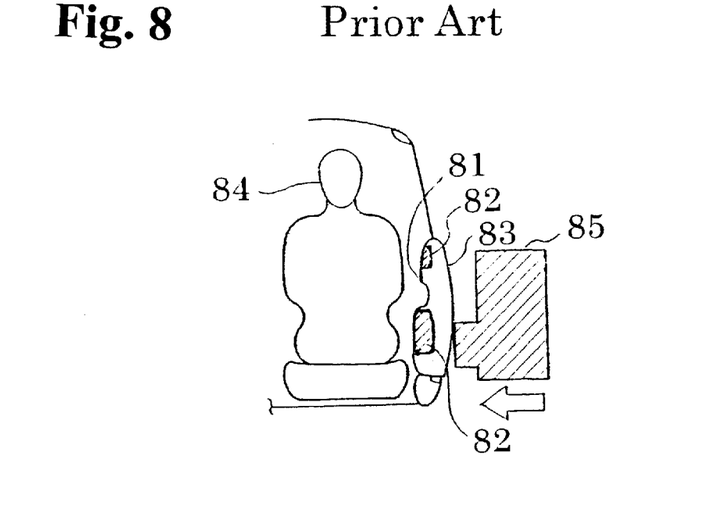
FIG. 8 is a cross-sectional view of a conventional energy absorber for side projection in an attached state.

As shown in FIG. 8 (vertical cross-sectional view), shock energy absorbers 82, for protecting the chest to shoulder part of the passenger in a vehicular collision, are provided at necessary positions on the rear face of a door trim 81 of a vehicle (the face on the opposite side to the inside of the vehicle). The energy absorbers 82 usually consist of a material with excellent energy-absorbing characteristics such as rigid polyurethane foam, or bead-like foam bodies of polypropylene, polyethylene, or a polyolefine-type resin, and are securely attached to the door trim 81 using hot-melting adhesive or double-sided tape or the like.

Each of the above materials of the energy absorbers has a comparatively high level of hardness, and therefore the energy absorbers 82 have low shock-durability and tend to break during a collision. Consequently, when the conventional energy absorbers 82 are used, as for instance in the case shown in FIG. 8, where an MDB (Moving Deformable Barrier) 85 has collided sideways from the outer plate 83 side, the shape of the outer plate 83 becomes distorted and the MDB 85 enters the inside of the vehicle, and as a result, the energy absorbers 82 are broken by the shock and are shattered. Then, after the energy absorbers 82 have been lost, the crash dummy 84 collides with the door trim 81, and as a result, no energy-absorbing effect is obtained from the energy absorbers 82.

SUMMARY OF THE INVENTION

It is an object of the present invention to solve the problems described above in the art by providing a shock absorber comprising a light foam resin material having an ideal F-S waveform required for a shock absorbing pad.

In a first aspect, a shock absorber consists of foam resin material, and its cross-sectional area in a direction perpendicular to a compression axis direction changes at least partially in the compression axis direction.

In a second aspect, a shock absorber consists of foam resin material, and its cross-sectional area in a direction perpendicular to a compression axis direction increases at least partially in the compression axis direction.

By changing the cross-sectional area of the shock absorber, a relation between distortion and compressive stress in the compression axis direction is made approximately linear.

Even in the case of a pad consisting of a foam resin material which does not have a linear F-S waveform, by at least partially changing and/or increasing the cross-sectional area thereof in the compression axis direction, the relation between distortion and compressive stress in the compression axis direction, that is the F-S waveform, can be made approximately linear.

The shock absorber of the present invention may consist of a rigid polyurethane foam which has an F-S waveform such as that shown in FIG. 2C, and can easily be used as a shock absorbing pad having an ideal F-S waveform by providing a taper, a dip, a notch, a step, or the like therein.

The shock absorber of the present invention is particularly useful inside a vehicle as a shock absorbing pad for protecting a passenger of the vehicle, by absorbing a shock received by the passenger when the vehicle suffers a collision, and especially as a shock absorbing pad incorporated in a door trim and center pillar trim and the like of the vehicle, to protect the passenger from his chest to his shoulders.

Figure 3:
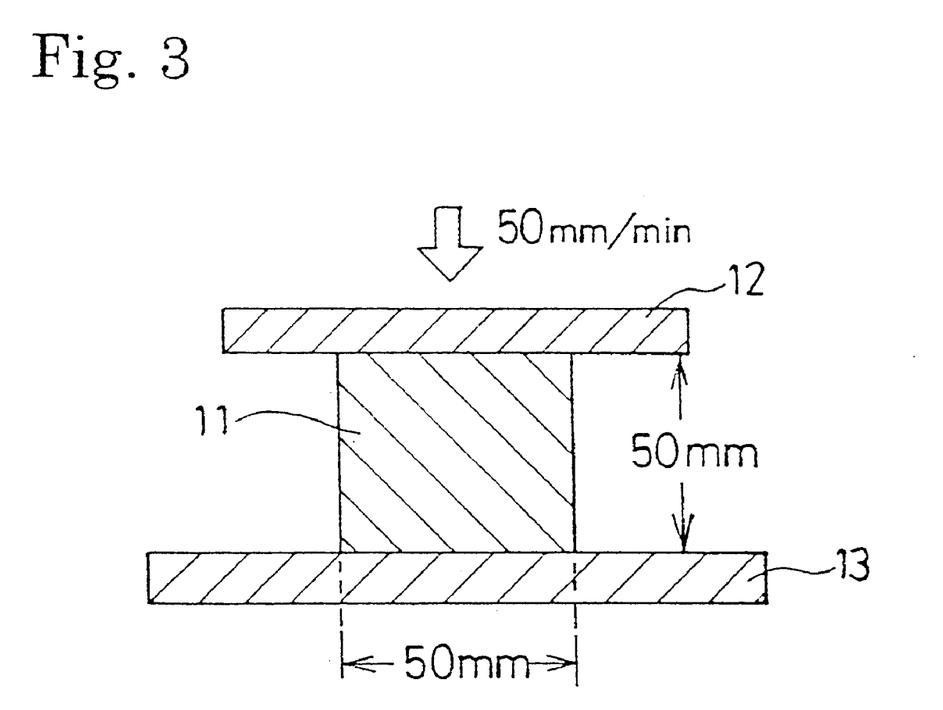
FIG. 3 is a schematic cross-sectional view showing methods of measuring F-S waveforms.

In the present invention, the F-S waveform (that is, the relation between compressive distortion (stroke) and the compressive stress in the compression axis direction) of the material itself is determined, as shown in FIG. 3, by placing a test material 11 having a thickness of 50 mm×50 mm×50 mm between pressure jigs 12 and 13, compressing it at a compression speed of 50 mm/min, and measuring its compressive stress against the compression stroke.

The F-S waveforms of shock absorbing pads 1A to 1I, as shown later in FIG. 1A to FIG. 1I, can be similarly determined by replacing the test material of FIG. 3 with the shock absorbing pads 1A to 1I, and inserting them between the pressure jigs 12 and 13 as above.

It is another object of the present invention to provide a shock energy absorber which does not shatter after breakage due to shock, can adequately achieve a desired energy absorbing ability, and has superior effects in protecting passengers.

In a third aspect, a shock energy absorber has an energy-absorbing material and a reinforcing material attached thereto.

Since the energy absorber of the third aspect has the reinforcing material attached to an energy-absorbing material, even when the energy-absorbing material breaks due to a shock, the reinforcing material prevents it from shattering, thereby reliably holding the energy-absorbing material in its designed position. Consequently, it can adequately achieve a desired energy-absorbing ability, and reliably protect passengers.

The reinforcing material may comprise worsted felt, cheesecloth, tufnel, a metal sheet, or a resin sheet. Such a reinforcing material should preferably be glued to a surface of the energy-absorbing material by an adhesive, or alternatively, attached in a single body to a surface of the energy-absorbing material by joint blowing during manufacture of the energy-absorbing material.

The energy absorber of the third aspect is particularly appropriate for use inside a vehicle, and especially as an energy absorber for side projection incorporated in a door trim of the vehicle, to protect a passenger from his chest to his shoulders.

DETAILED DESCRIPTION OF THE PREFERRED EMBODIMENTS

Preferred embodiments of the present invention will be described in detail below with reference to the accompanying drawings.

FIG. 1A to FIG. 1I and FIG. 4B are schematic cross-sectional views of embodiments of a shock absorbing pad of the present invention. In FIGS. 1A–1I, symbol X shows the direction of compression.

Figure 4A:
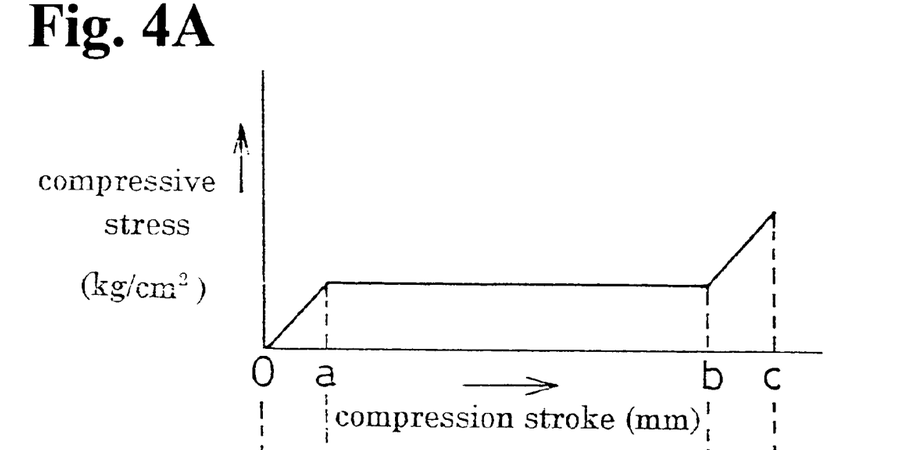
FIG. 4A to FIG. 4C are diagrams explaining principles of stabilizing F-S waveforms in the present invention, FIG. 4A being a graph showing an F-S waveform of a cubic rigid polyurethane foam test piece, FIG. 4B being a cross-sectional view of an example of a shock absorbing pad of the present invention, and FIG. 4C being a graph showing an F-S waveform of the shock absorbing pad of FIG. 4B.
Figures 4B, 4C:
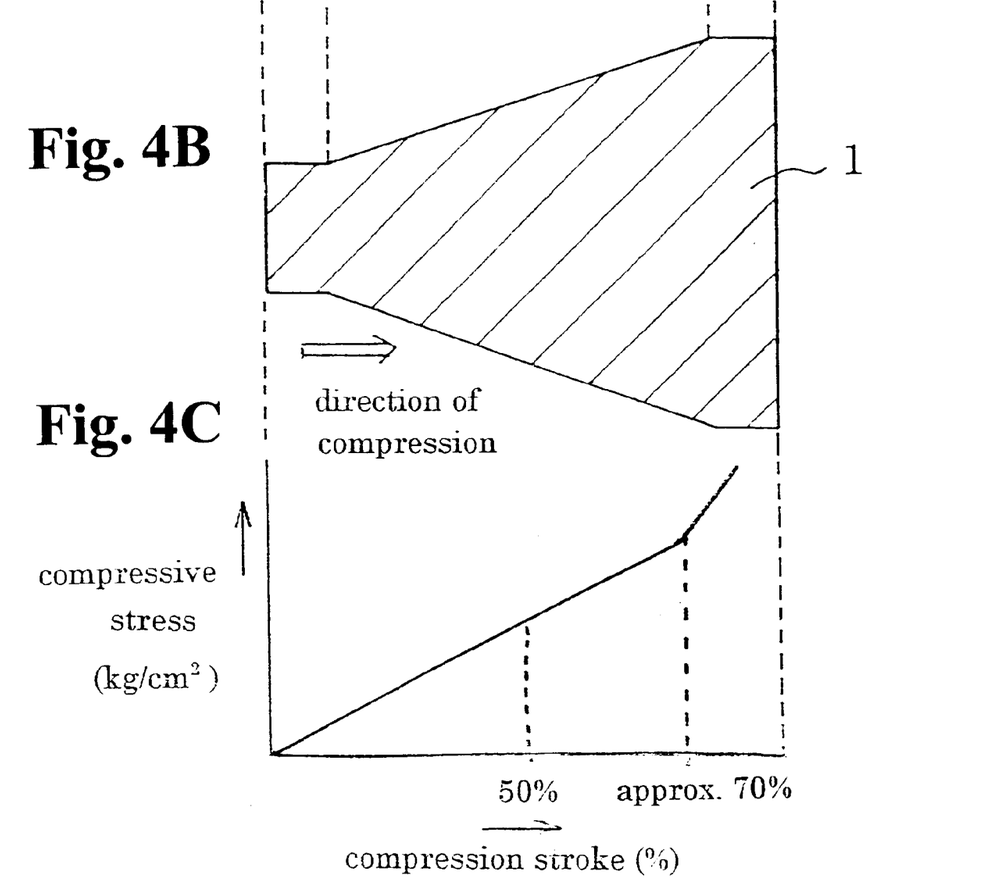

The shock absorbing pads 1A, 1B, 1C, 1D, 1E, 1F, 1G, 1H, 1I and 1 of FIGS. 1A to 1I and FIG. 4B consist of rigid polyurethane foam, and are designed so that their cross-sectional area in the direction perpendicular to the compression axis direction X (hereinafter this sectional area will sometimes be abbreviated to "pressure area") at least partially increases and/or changes in the compression axis direction X, whereby their F-S waveforms are approximately linear. As shown in FIG. 2C, rigid polyurethane foam suitable for the present invention has approximately constant compressive stress in the compression stroke region a to b, irrespective of the compression stroke. Therefore, the surface load can be thought of as proportional to the pressure area, and by changing the pressure area (that is, the cross-sectional area in the direction perpendicular to the compression axis direction X) corresponding to the compression stroke, it is easy to design the foam so that the compression stroke and the compressive stress are proportional, in other words, so that the F-S waveform is almost linear That is, as shown in example 2 below, when the F-S waveform of a cubic test piece of rigid polyurethane foam suitable for the present invention, having a size of 50 mm×50 mm×50 mm, was measured using the method of FIG. 3, as shown in FIG. 4A, in the region where the compression stroke is 0 to a, the stress and stroke are approximately proportional, in the stroke region a to b, the stress is approximately constant irrespective of the stroke, and in the stroke region b to c, the stress is once again proportional to the stroke. As shown in FIG. 4B, this type of rigid polyurethane foam is used to form a shock absorbing pad 1, having an upper portion (the left side portion in FIG. 4B) 0 to a with a uniform cross-sectional shape, but in the subsequent region a to b, the cross-sectional area gradually increases, and in the region b to c, the cross-sectional shape is uniform, thereby forming an approximately trapezoidal cross-sectional shape (an approximately truncated cone). Consequently, as shown in FIG. 4C, the F-S waveform for the stroke region a to b is improved, making it possible to achieve an ideal F-S waveform which has an overall linear shape.

Figure 1A:
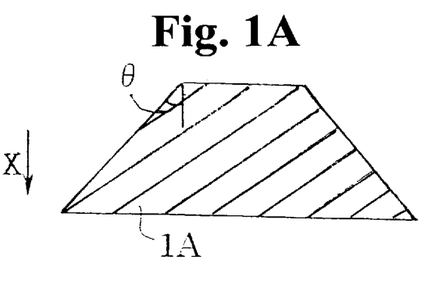
FIG. 1A to FIG. 1I are schematic cross-sectional views of examples of the shock absorber of the present invention.
Figure 1B:
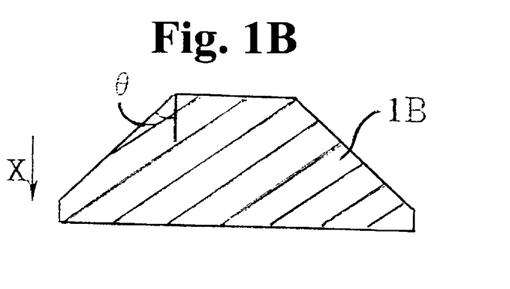
Figures 1C, 1D:
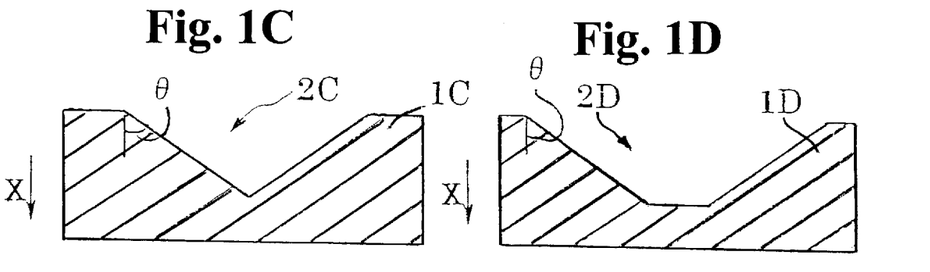
Figure 1E:
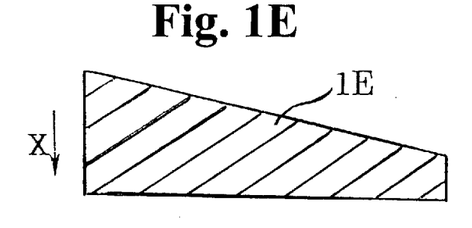
Figure 1F:
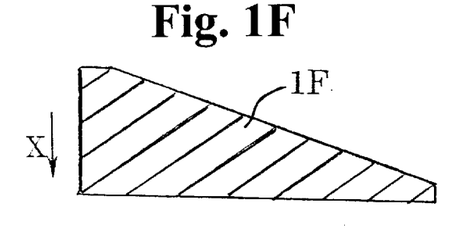
Figure 1G:
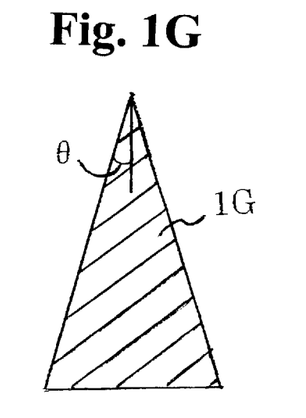
Figure 1H:
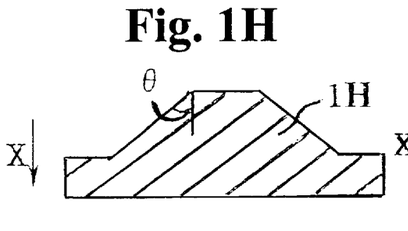

The pressure area of the shock absorbing pad of the present invention needs only to be designed so that the desired F-S waveform can be obtained in a predetermined compression stroke in accordance with required characteristics, and there are no restrictions on its shape. For instance, as example shapes of the shock absorbing pad of the present invention, FIG. 4B, FIG. 1A, FIG. 1B, and FIG. 1H show shock absorbing pads 1, 1A, 1B, and 1H, which are trapezoidal or approximately trapezoidal in cross-section. As shown in FIG. 1C and FIG. 1D, dips 2C and 2D, which are respectively triangular and trapezoidal in cross-section, are provided in the centers of the shock absorbing pads 1C and 1D. As further examples, FIG. 1E, FIG. 1F, and FIG. 1G show shock absorbing pads 1E, 1F, and 1G, which are triangular or substantially triangular in cross-section. Furthermore, when used as a material inside a vehicle, the pad may be attached to the door trim surface, and in this case, one of its faces should preferably be a shape that will fit along the shape of the door trim. For instance, a shock absorbing pad 1I of irregular shape may be provided, such as that shown in FIG. 1I, but there are no restrictions whatsoever. When the shock absorbing pad is provided with a taper or a notch, the angle of the inclination of such portions (angle θ in FIGS. 1A–1D, 1G and 1H should preferably be greater than 15°.

As has already been explained, the shock absorbing pad of the present invention should preferably comprise a rigid polyurethane foam having an F-S waveform such as that shown in FIG. 2C, that is, one which does not have a yield point (a point in its F-S waveform where stress decreases after rising in correspondence with distortion), the distortion and stress being almost proportional in the initial period of compression, the stress being practically constant versus changes in distortion after it reaches a certain stress value and then increasing once more in the final period of compression.

One such rigid polyurethane foam is made by foaming reaction of polyurethane foam raw materials, including polyhydroxyl compounds and polyisocyanate compounds as its main components. Particles with an average diameter of 0.05 to 100 $\mu$m may be included in the foam raw material at a ratio of 1 to 200 parts by weight per 100 parts by weight of hydroxyl compound. With this rigid polyurethane foam, the above particles are dispersed within the cell membranes of the rigid polyurethane foam, where they remain. Consequently, when the rigid polyurethane foam is compressed, its stress with respect to changing distortion is constant, as shown in FIG. 2C. There is no yield point, giving good energy absorbing efficiency.

In general, when a rigid polyurethane foam is compressed, cells are randomly destroyed, creating a yield point in the F-S waveform and stress which is not constant with respect to changes in distortion. However, in the case of the rigid polyurethane foam in the present invention, the cells are destroyed sequentially from the side to which compressive distortion is applied. As a result, as shown in FIG. 2C, an F-S waveform is obtained in which there is no yield point, distortion and stress are approximately proportional during the first stage of compression, stress is practically constant with respect to changes in the distortion after reaching a certain stress value, and stress increases in the final period of compression.

The mechanism whereby the presence of particles in the cell film ensures that stress is constant with respect to changes in the distortion is still not fully clear, but it may be supposed that the presence of particles of a different substance keeps the destruction of each cell constant. That is, the presence of the particles becomes the stress concentration point in each cell, thereby having the same effect as providing a notch.

Next, a method of forming this type of rigid polyurethane foam will be explained.

This rigid polyurethane foam is prepared by foaming rigid polyurethane foam raw materials, including polyhydroxyl compounds and polyisocyanate compounds as its main components, to which are added particles of a specific diameter, and in addition, a catalyst, a blowing agent, a foam stabilizer, and other supplementary agents as desired.

There are no particular restrictions on the polyhydroxyl compound used. For instance, polyether polyols, obtained by ring-opening addition polymerization of an alkylene oxide, such as ethylene oxide or propylene oxide, with glycerine, sucrose, or ethylenediamine; polyether polyols, obtained by polycondensation of a polybasic acid, such as adipic acid and succinic acid, and a polyhydroxyl compound, such as ethylene glycol or propylene glycol; or polyester polyols, obtained by ring-open polymerization of lactones, are acceptable, and can be used independently or in combinations of two or more.

To improve the heat durability of the obtained rigid polyurethane foam, the average OH value of the total polyhydroxyl compound should be greater than 200, and preferably greater than 300.

As the polyisocyanate compound, it is possible to use an aromatic isocyanate such as diphenylmethane diisocyanate or tolylene diisocyanate; an alicyclic isocyanate such as isophorone diisocyanate; an aliphatic isocyanate such as hexamethylene diisocyanate; and crude substances thereof, which can be used independently or in combinations of two or more.

The amount of polyisocyanate used with respect to the total amount of polyhydroxyl compounds and compounds having active hydrogen, such as water, that is, the isocyanate index should preferably be between 80 to 130 when manufacturing normal rigid polyurethane foam, and between 150 to 350 when manufacturing isocyanurate denatured rigid polyurethane foam.

The particles of specific diameter, formulated in order to satisfy the above F-S waveform, have an average diameter of 0.05 to 100 $\mu$m, preferably 0.5 to 50 $\mu$m, and more preferably 1 to 30 $\mu$m. When the average diameter of the particles used is less than 0.05 $\mu$m, it is not possible to form a stress concentration point, and when the average diameter is greater than 100 $\mu$m, it is difficult to use an urethane blowing device, which is normally used.

As long as the particles used have the average diameters mentioned above, there are no particular restrictions. The following may for instance be used an inorganic compound such as calcium carbonate, aluminum hydroxide; metal such as iron and aluminum; in addition, organic substances such as polymide, polyvinyl chloride, and melamine may be used; these may be used independently or in combinations of two or more.

With respect to 100 parts by weight of polyhydroxyl compounds in total, the amount of the above particles used must be between 1 to 200 parts by weight, preferably 2 to 50 parts by weight, and more preferably 5 to 50 parts by weight. When the amount of particles used is less than 1 part by weight, the stress concentration point is too small, and stress will not be constant with respect to distortion. On the other hand, when the amount of particles used exceeds 200 parts by weight, the coefficient of viscosity of the reactor fluid, which is used for mixing and agitating when forming the rigid polyurethane foam, will noticeably increase, thereby lowering the mixing and agitation efficiency and increasing the number of non-reactive components. This increase of nonreactive components leads to a reduction in formation heat during the reaction, and consequently reduces the ability to complete the reaction, causing insufficient strength and the like.

A known catalyst used in the manufacture of rigid polyurethane foam can be used as the catalyst. For instance, an organometalic compound such as dibutyltin dilaurate, lead octoate, stannous octoate; an amine compound such as triethylenediamine or tetramethylhexamethylenediamine, and in addition, a compound used in isocyanurate modification can be used, such as potassium N,N',N"-tris (diaminopropyl) hexahydro-s-tiiazine, potassium acetate, or potassium octoate.

Any blowing agent used in the manufacture of rigid polyurethane foam can be used; for instance, water, and chlorofluorocarbons such as trichlorofluoromethane, 1,1,2-trichloro-1,2,2-trifluoroethane; hydrochlorofluorocarbons such as dichlorotrifluorethane and dichlorotetrafluoroethane; hydrochlorocarbons such as methylene chloride; hydrofluorocarbons such as hexafluoropropane; and hydrocarbons such as pentane. Considering effects on the environment caused by dispersion into the atmosphere and the like, water is the most preferable of these. Generally, when water is overused, a great amount of heat is generated during foaming, and scorching is liable to occur inside the obtained rigid polyurethane foam. However, the present invention has the advantage (explained below) that particles are mixed in, so that the amount of heat generated is relatively low, thereby preventing scorching. The amount of water should preferably be between 0.5 to 10 parts by weight per 100 parts by weight of polyhydroxyl compound.

Any type of agent which is effective when used as rigid polyurethane foam can be used to formulate the foam stabilizer, for instance, polyoxyalkylenes such as polyoxyalkylene alkylethers, silicones such as organo-polysiloxane, and the like. However, in the present invention, a foam stabilizer having surface tension of between 16 to 22 dyne/cm, and particularly between 18 to 21.5 dyne/cm should preferably be used. By using this type of foam stabilizer, the desired rigid polyurethane foam can be reliably obtained. When a foam stabilizer with surface tension of less than 16 dyne/cm is used, phenomena such as cell roughness may occur, and when the surface tension is greater than 22 dyne/cm, the cells forming the obtained rigid polyurethane foam are almost spherical, and may not buckle evenly under a constant stress.

That is, when the cells are almost spherical, they have a short buckle stroke against input from the direction of their longer axis, and as a result, in the macroscopic "distortion-stress" characteristic of foam, which comprises a concentration of cells, the buckle region in which stress is constant, that is, the range of effective distortion, is diminished, lowering the energy-absorption efficiency. Generally, the stress obtained is itself related to the long-axis/short-axis ratio of the cells, and when this ratio is large, the long-axis direction has greater stress. Therefore, in the present invention, the long-axis/short-axis ratio of the cells of the obtained rigid polyurethane foam should be between 1 to 5, and preferably between 1.5 to 4.

In addition to the components mentioned above, other components which do not interfere with the objects of the present invention, for instance flame retardancy and the like, can be used as the foam raw material.

An ordinary method of manufacturing rigid polyurethane foam can be used for foaming, but the blowing speed should be adjusted to a rise time of between 10 to 140 seconds, and preferably between 15 to 110 seconds, to ensure that the desired rigid polyurethane foam is reliably obtained. When the rise time is shorter than 10seconds, it is not possible to obtain sufficient agitation time as required, and in addition, scorching may occur in the foam. On the other hand, when the rise time is longer than 140seconds, the cells become almost spherical, lowering the energy-absorbing efficiency as described above.

When rigid polyurethane foam obtained in this manner is compressed at a temperature of −30 to 100° C., there is no yield point, as shown in FIG. 2C, stress is as constant as possible over a wide range of changing distortion, and the cells are destroyed sequentially from the distortion side. Therefore, the rigid polyurethane foam has excellent compression characteristics and highly efficient shock energy absorption. More specifically, using the above method for manufacturing rigid polyurethane foam, it is possible to manufacture a rigid polyurethane foam having characteristics such that when a test body having width 50 mm×length 50 mm×height 30 mm is compressed in the direction of its height (the direction of the long diameter of the cells) at a compression speed of 50 mm/sec, stress is practically constant (fluctuating by ±0.5 kg/cm$^2$) within a range of 2 to 8 kg/cm$^2$ at a compression rate of 10 to 65%.

To maintain the characteristics of a shock absorber, the above rigid polyurethane foam should have foam density measured using Japanese Industrial Standard (JIS) A-9514 of 25 to 90 kg/m$^3$, and preferably 30 to 80 kg/m$^3$.

The above rigid polyurethane foam is suitable as the constituent material for the shock absorbing pad of the present invention, but the shock absorbing pad of the present invention is not limited to one manufactured using the above rigid polyurethane foam. That is, even when using a rigid polyurethane foam which does not exhibit a linear F-S waveform, such as is shown in FIG. 2C, it is possible to obtain an approximately linear relation between compressive stress and distortion in the compression axial direction by carefully tailoring the shape of the foam, that is, by adjusting the level of change in the compression axial direction in the cross-sectional area of the compression axial direction and the vertical direction, so that the object of the present invention can be achieved using other types of rigid polyurethane foam. However, since the rigid polyurethane foam described above makes it possible to realize the present invention easily with a relatively singular shape, it is preferable for practical reasons.

Next, the present invention will be explained in more detail by examples and comparative examples.

EXAMPLE 1

Figure 1I:
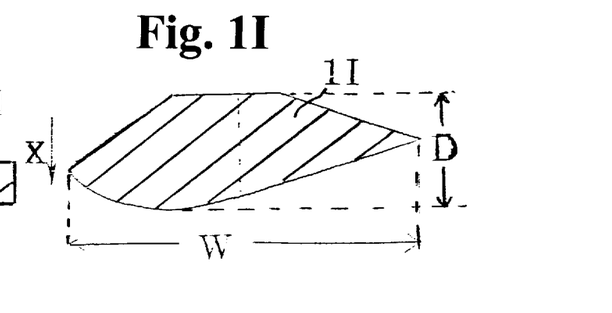
Figure 5:
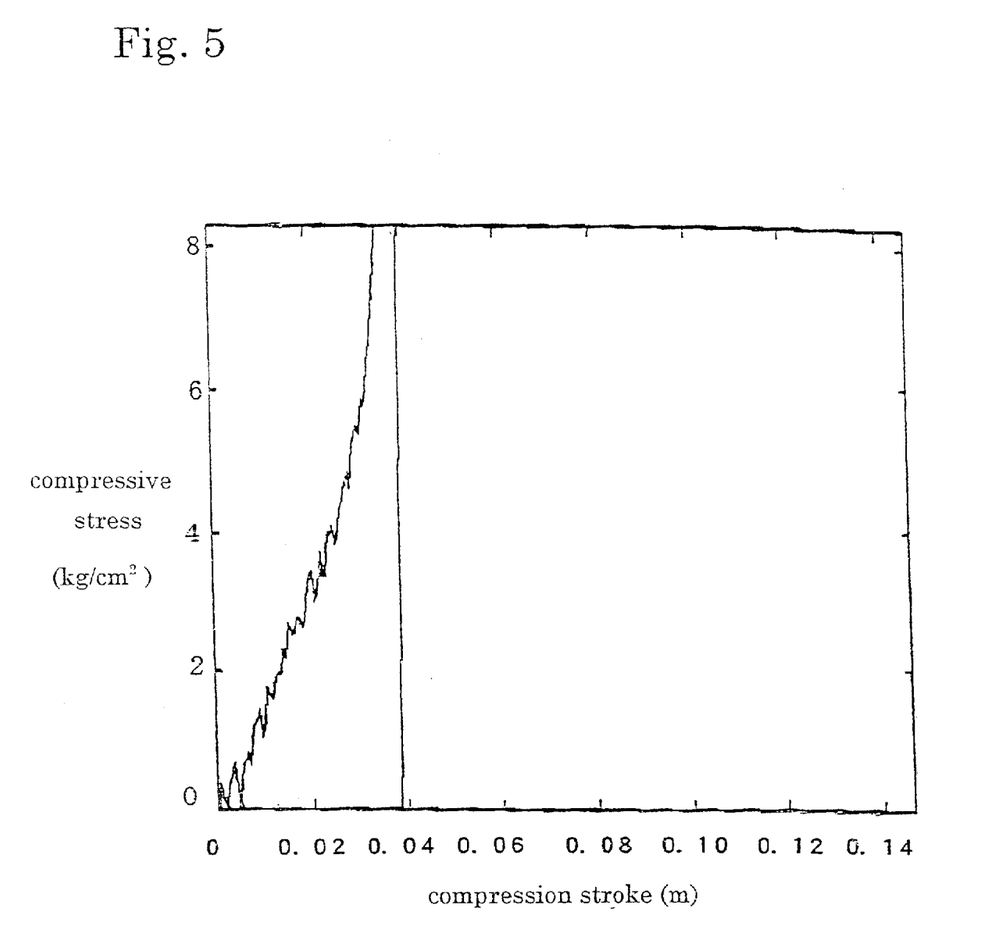
FIG. 5 is a graph showing the results of example 1.

The F-S waveform of the shock absorber pad 1I, comprising rigid polyurethane foam and having the shape shown in FIG. 1I (width W=100 mm, thickness D=40 mm in FIG. 1I), was determined when the total surface of the shock absorber pad 11 was compressed in the direction indicated by symbol X at a compression speed of 6 m/sec. FIG. 5 shows the results. As can be understood from FIG. 5, the shock absorber pad 1H has an approximately linear F-S waveform.

EXAMPLE 2, COMPARATIVE EXAMPLE 1

Rigid polyurethane foam was manufactured with the formula shown in Table 1.

Firstly, 200 g of polyhydroxyl compound was measured into a one-liter paper cup, and to this were added predetermined amounts of a catalyst, a silicone foam-stabiizer, and water. This was agitated for approximately 10 seconds using a propeller-type agitator, a predetermined amount of particles was added, and this was further mixed and agitated for approximately 30 seconds.

Then, a predetermined amount of crude diphenylmethane diisocyanate was added to this evenly mixed solution, which was then agitated at high speed for approximately 5seconds at room temperature, and this high-speed agitated reactor solution was poured into a bag, made by setting polyethylene in a wooden mold of dimensions 250 mm×250 mm×250 mm, and foamed at room temperature. The foam obtained was cured for approximately 10 minutes in an oven at 50° C. to produce rigid polyurethane foam. Foam rise time (foaming and hardening time) was defined as the time needed from the start of high-speed agitation, after the crude diphenylmethane diisocyanate had been added, until it was apparent that the volume of the reactor solution had stopped increasing, and the values are shown in Table 1. Furthermore, the density of the obtained foam was measured using Japanese Industrial Standard (JIS) A-9514, the long-axis/short-axis ratio of the foam cells was measured by photographic measurement on an enlarged photograph of the foam, and both results are shown in Table 1. After blowing and hardening, the foam was set aside for three days before the measurements were taken.

TABLE 1

|  | Example 2 | Comparative Example 1 |
|---|---|---|
| Formula (Weight)* | | |
| Polyhydroxyl Compound | 100 | 100 |
| Foam-stabilizer | 2.0 | 2.0 |
| Flame retardant | 10 | 10 |
| Water | 3.0 | 3.0 |
| Catalyst | 1.3 | 1.3 |
| Particles | 30 | 0.5 |
| Polyisocyanate | 166 | 166 |
| Rise Time (seconds) | 50 | 58 |
| Foam Density (kg · m$^3$) | 50 | 45 |
| Long-Axis/Short-Axis Ratio of Cells | 2.0 | 1.2 |

*Polyhydroxyl Compound: Polyether Polyol manufactured by Takeda Chemical Industries, Ltd., [GR30C] (OH valency = 430)
Foam-stabilizer: Silicone foam-stabilizer [L-5430] manufactured by Nippon Unicar Co., Ltd., (surface tension 19.2 dyne/cm) (The surface tension of the foam-stabilizer was measured at 25° C. using an A-3 type CBVP-system surface tension gauge, manufactured by Kyowa Chemicals Co., Ltd.)
Catalyst: tetramethylhexamethylene diamine [Kao Riser No. 1] manufactured by Kao Corporation.
Particles: [Whiteon SB] heavy calcium carbonate manufactured by SHIRAISHI CALCIUM KAISHA LTD., (average particle diameter of 1.8 μm)
Polyisocyanate: diphenylmethane diisocyanate manufactured by Sumitomo Bayer Urethane Co., Ltd. [44V20].

Figure 14A:
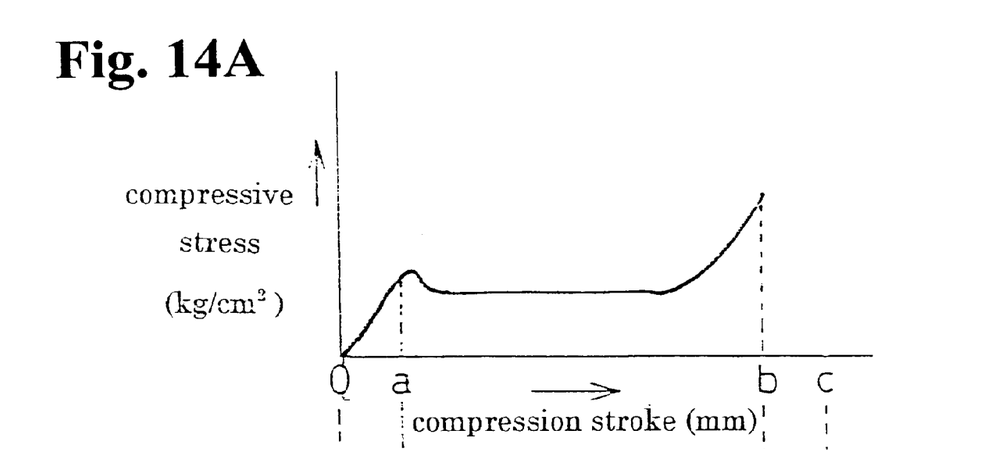
FIG. 14A to FIG. 14C are diagrams explaining an F-S waveform of a comparative example, FIG. 14A being a graph showing an F-S waveform of a cubic rigid polyurethane foam test piece, FIG. 14B being a cross-sectional view of an example of a shock absorbing pad of the comparative example, and FIG. 14C being a graph showing an F-S waveform of the shock absorbing pad of FIG. 14B.
Figures 14B, 14C:
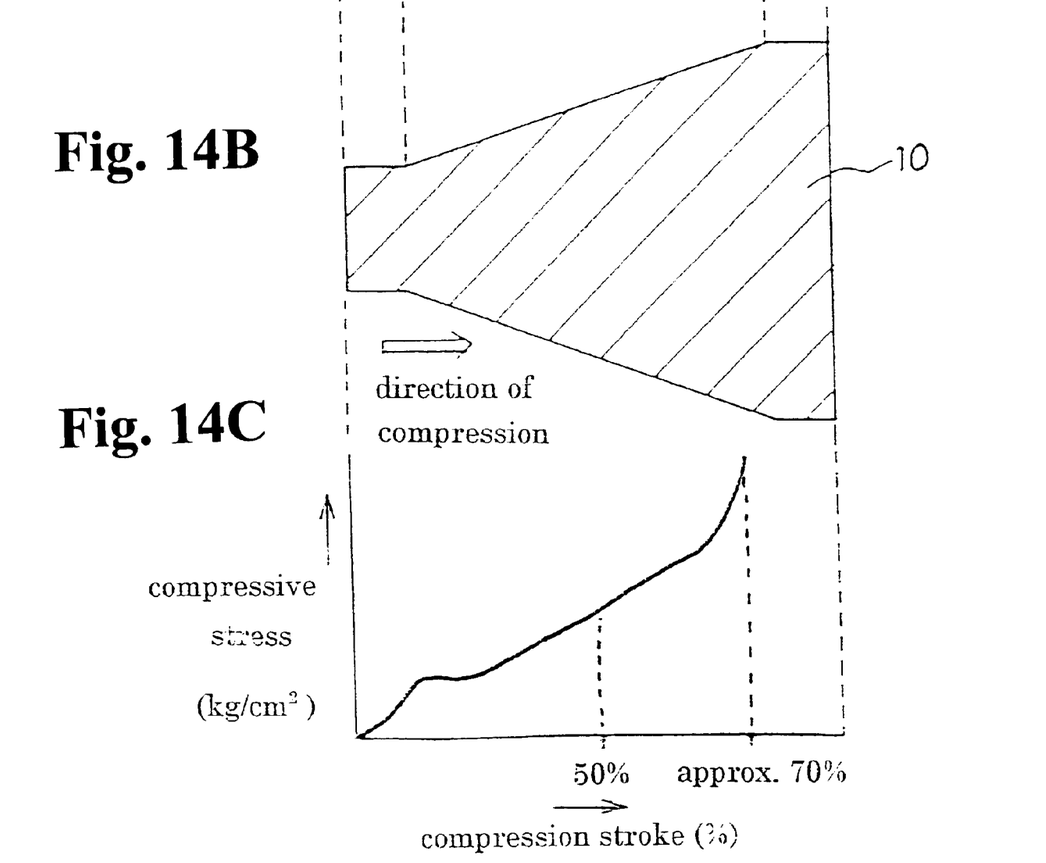

Cubic test pieces of 50 mm×50 mm×50 mm were made using various types of rigid polyurethane foam, and their F-S waveforms were measured using the method shown in FIG. 3. As shown in FIG. 4A, in the case of the rigid polyurethane foam of example 2, in the region where the compression stroke is 0 to a, the stress and stroke are approximately proportional, in the stroke region a to b, the stress is approximately constant irrespective of the stroke, and in the stroke region b to c, the stress is once again approximately proportional to the stroke. By contrast, as shown in FIG. 14A, the rigid polyurethane foam of comparative example 1 has a yield point. Furthermore, as shown respectively in FIG. 4B and FIG. 14B, these types of rigid polyurethane foam were used to form shock absorbing pads 1 and 10, having an upper portion (the left side portion in FIG. 4B and FIG. 14B) 0 to a with a uniform cross-sectional shape, but in the region a to b which follows it, the cross-sectional area gradually increases, and in the region b to c, the cross-sectional shape is uniform, thereby forming an approximately truncated cone (the shock absorbing pad 1 of FIG. 4B and the shock absorbing pad 10 of FIG. 14B have identical dimensions and identical shapes). As shown in FIG. 4C, when the F-S waveforms were measured in the same way, the F-S waveform for the stroke region a to b was improved, making it possible to achieve an ideal F-S waveform having an overall linear shape. However, as shown in FIG. 14C, the performance of the shock absorbing pad 10, which uses the rigid polyurethane foam of comparative example 1, was insufficient. Therefore, in order to make a shock absorbing pad with an ideal F-S waveform, such as that shown in FIG. 4C, using the rigid polyurethane foam of comparative example 1, its shape must be adjusted further.

As explained in detail above, according to the shock absorbing pad of the present invention, it is possible to provide a light shock absorber comprising foam resin material which has an ideal F-S waveform having a linear shape.

The shock absorber of the present invention should preferably comprise rigid polyurethane foam, and the F-S waveform of the shock absorbing pad can be easily adjusted by adjusting its shape as appropriate.

The shock absorber of the present invention is extremely useful when used industrially as material inside a vehicle as a shock absorbing pad for protecting a passenger in a vehicle, by absorbing a shock received by the passenger when the vehicle suffers a collision, and especially as a shock absorbing pad incorporated in a door trim and center pillar trim and the like of the vehicle, to protect the passenger at the upper torso.

Figures 6A, 6B, 6C, 6D, 6E:
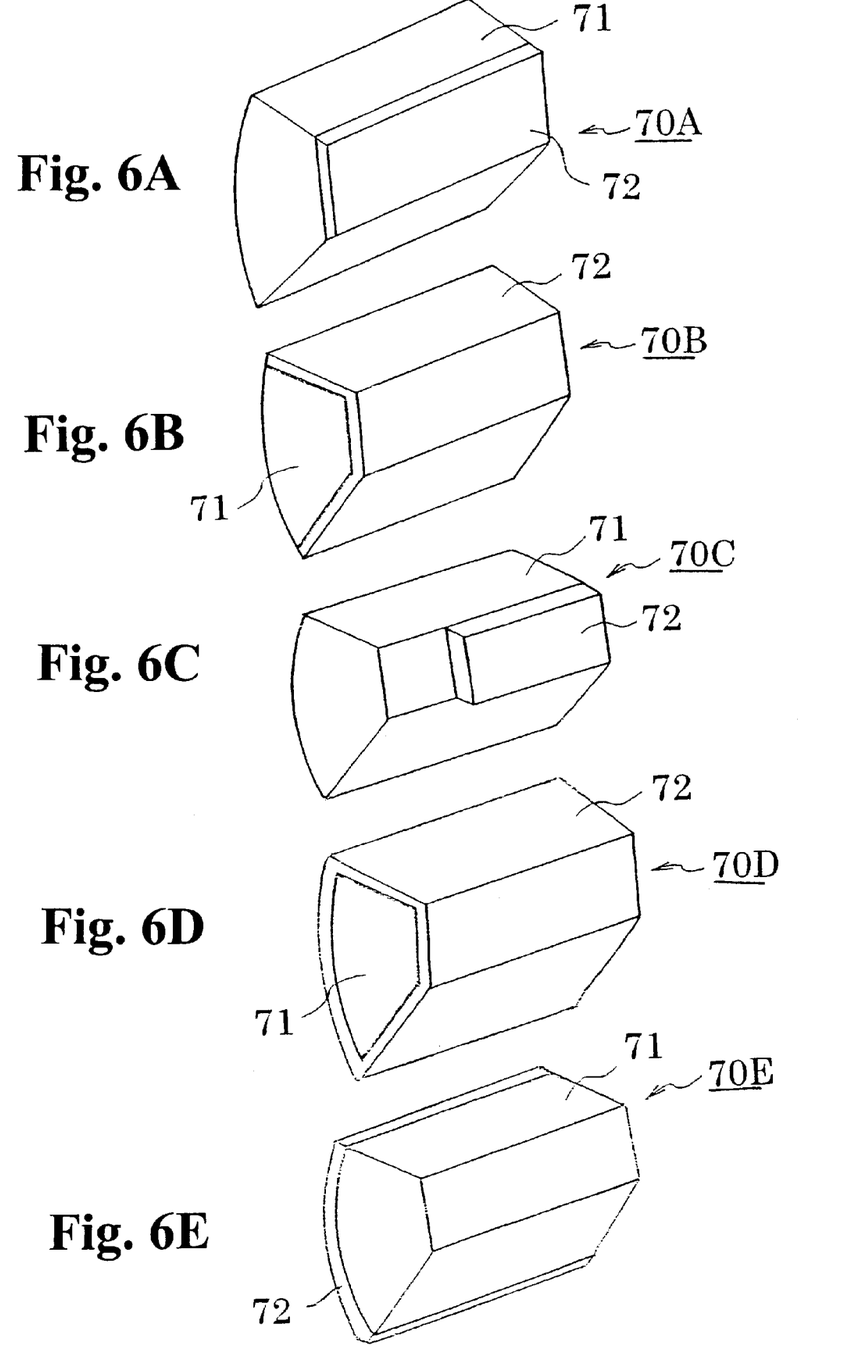
FIG. 6A to FIG. 6E are perspective views of examples of an energy absorber.
Figure 7:
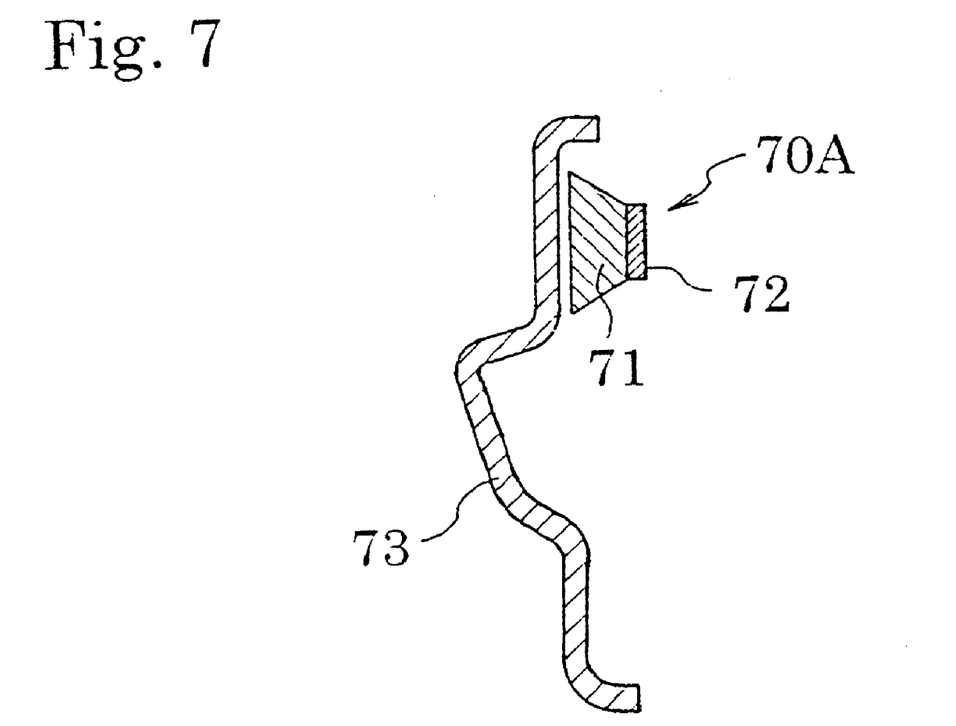
FIG. 7 is a cross-sectional view showing an example of attaching an energy absorber to a door trim.

FIGS. 6A to 6E are perspective views of examples of a third aspect of the shock energy absorber of the present invention, and FIG. 7 is a cross-sectional view of an example of how it is attached to a door trim.

The energy absorbers 70A to 70E have an energy absorbing material 71 and a reinforcing material 72 attached thereto. There are no particular restrictions on the attachable area and attachable position of the reinforcing material 72, it being only necessary that adequate shatterproofing be achieved so that the energy absorber is kept in its attached position and broken pieces of the energy absorbing material 71 do not shatter when broken due to a collision.

In the absorber 70A of FIG. 6A, the reinforcing material 72 is provided so as to completely cover only one face of the substantially conical trapezoidal energy absorber 71 (as shown in FIG. 7, this face is usually the face on the opposite side to the door trim 73 when the energy absorber is attached to the door trim 73. Hereinafter, this will be abbreviated as "front face").

In the absorber 70B of FIG. 6B, the reinforcing material 72 is provided so as to cover three faces of the energy absorbing material 71, that is, it covers the faces which are exposed when the energy absorbing material 71 is attached to the door trim.

In the absorber 70C of FIG. 6C, the reinforcing material 72 is provided to only one portion of the front face of the energy absorbing material 71.

In the absorber 70D of FIG. 6D, the reinforcing material 72 is provided on all the surrounding faces of the energy absorbing material 71.

In the absorber 70E of FIG. 6E, the reinforcing material 72 is provided on the face which is on the same side as the door trim 73 when the absorber is attached to the door trim 73 (hereinafter, this face will be abbreviated as "rear face").

From the point of the shatterproof face, the reinforcing material 72 should preferably be provided so as to cover at least the front face of the energy absorbing material 71, as shown in FIG. 6A, or to cover the faces which are exposed when the energy absorbing material 71 is attached, as shown in FIG. 6E, or to cover all the surrounding faces of the energy absorbing material 71, as shown in FIG. 6D. However, since the attachable area and attachable position of the reinforcing material which are appropriate for obtaining adequate shatterproofing differ depending on the shape of the energy absorbing material and the attached position of the energy absorber (that is, the positional relation of the crash dummy and the MDB to the energy absorber), design should preferably be carried out as appropriate in consideration of costs and shatterproofing effectiveness.

As shown in FIG. 6C, when the reinforcing material 72 is partially provided, it should preferably be provided to at least one of the exposed faces of the energy absorbing material 71 (the front face in FIG. 6C), so as to cover no less than 15% of the area of this exposed face.

There are no particular restrictions on the attachment position of the reinforcing material 72, but in consideration of shatterproofing, it should preferably be provided to at least the front face side of the energy absorbing material 71

A conventional energy absorber is used as the energy absorbing material 71. It is possible to use the rigid polyurethane foam mentioned above, or bead-like foam body comprising polypropylene, polyethylene or polyolefinic resin.

For the reinforcing material 72, there are no particular restrictions, the only requirements being that the material used prevents shattering of the energy absorbing material 71 and does not increase the height and weight of the energy absorber. Generally, it is possible to use a natural fiber or compound fiber or woven cloth or non-woven cloth, for instance, worsted felt, cheesecloth, tufnel, a metal sheet, a resin sheet and the like.

If the reinforcing material is too thin, it will not have sufficient reinforcing effects, and if it is too thick, the height and weight of the energy absorber will be increased. Therefore, depending on the material used, the reinforcing material should preferably have a thickness of between 0.5 to 3.0 mm. Similarly, if too little reinforcing material is provided, its reinforcing effect will be insufficient, and if too much is provided, the height and weight will be increased. Therefore, approximately 100 to 200 $g/m^2$ of reinforcing material is preferable.

As methods of attaching this type of reinforcing material to the energy absorbing material, an adhesive of urethane-type, rubber-type, hot-melting-type, or the like, can be pasted on, or one-shot foaming can be carried out during manufacture of the energy absorber, or the like.

The shape and size of the energy absorber of the present invention are the same as those of conventional energy absorbers, and it can be attached to a vehicle by the same methods as for the conventional energy absorbers.

FIGS. 6A–6E and 7 explained examples of energy absorbers for side projection, but the energy absorber of the present invention is not limited to the energy absorber for side projection, and can also be applied in energy absorbers incorporated in all types of components inside a vehicle, such as a headlining trim and a center pillar trim, for protecting the chest, waist, stomach, head portions, and the like of passengers.

Below, further examples of the present invention and a comparative example will be explained in detail.

EXAMPLES 3 AND 4, COMPARATIVE EXAMPLE 2

Figures 9A, 9B, 9C:
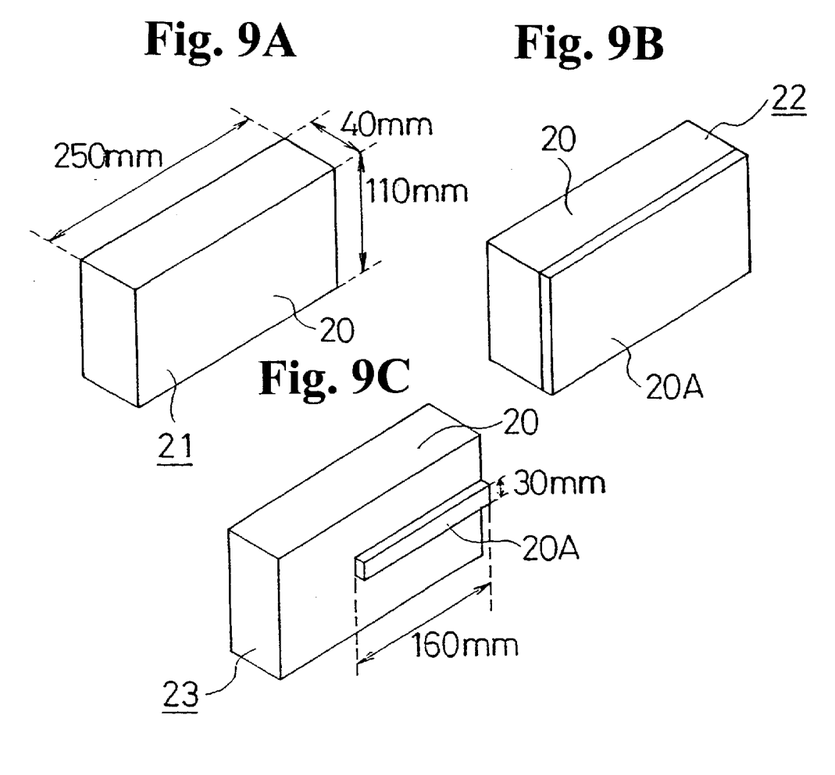
FIG. 9A to FIG. 9C are perspective views of test bodies used in examples 2, 3 and in comparative example 1.

The test bodies 21, 22, and 23 shown in FIGS. 9A to 9C were prepared. Test body 21 comprises only rigid polyurethane foam 20 of dimensions 250 mm×110 mm×40 mm; test body 22 comprises rigid polyurethane foam 20 of the same shape as the test body 21, having a reinforcing material comprising worsted felt 20A (application 180 $g/m^2$, thickness 3 mm) provided on its surface using a urethane-type adhesive. Furthermore, the test body 23 comprises rigid polyurethane foam 20 of the same shape as the test body 21, having a reinforcing material comprising worsted felt 20A (application 180 $g/m^2$, thickness 3 mm) of size 30 mm×160 mm provided on a part of its surface using a urethane-type adhesive.

Figure 10:
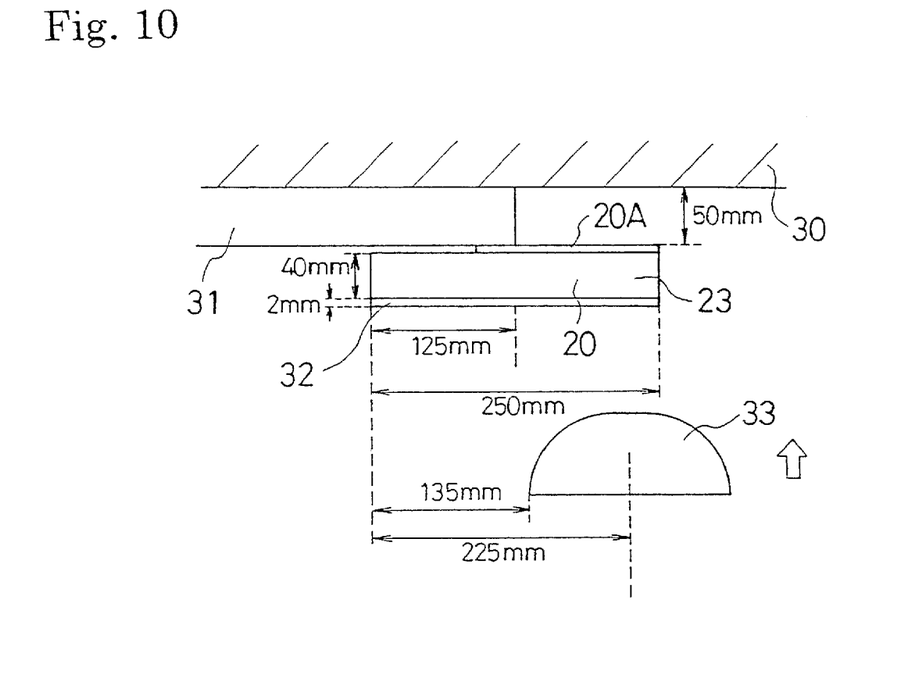
FIG. 10 is a diagram explaining the test methods of examples 2, 3 and comparative example 1.

The shatterproofing effects of these were confirmed, by the method shown in FIG. 10, using the non-reinforced test body 21 in comparative example 2, and the test bodies 22 and 23 in examples 3, 4 respectively. That is, the test body 23 (or 21 or 22) was attached to a fixed board 30, with a spacer 31 of thickness 50 mm in between (in the cases of test bodies 22 and 23, the worsted felt 20A was attached on the spacer 31 side), polypropylene plate 32 of dimensions 250 mm×110 mm×2 mm was attached to the surface of the test body 21 to 23, and a chest load element 33 was collided against the polypropylene plate 32 in the positional relation shown in FIG. 10, at a speed of 3.5 m/sec, and the F-S waveform at that time was determined.

Figure 11:
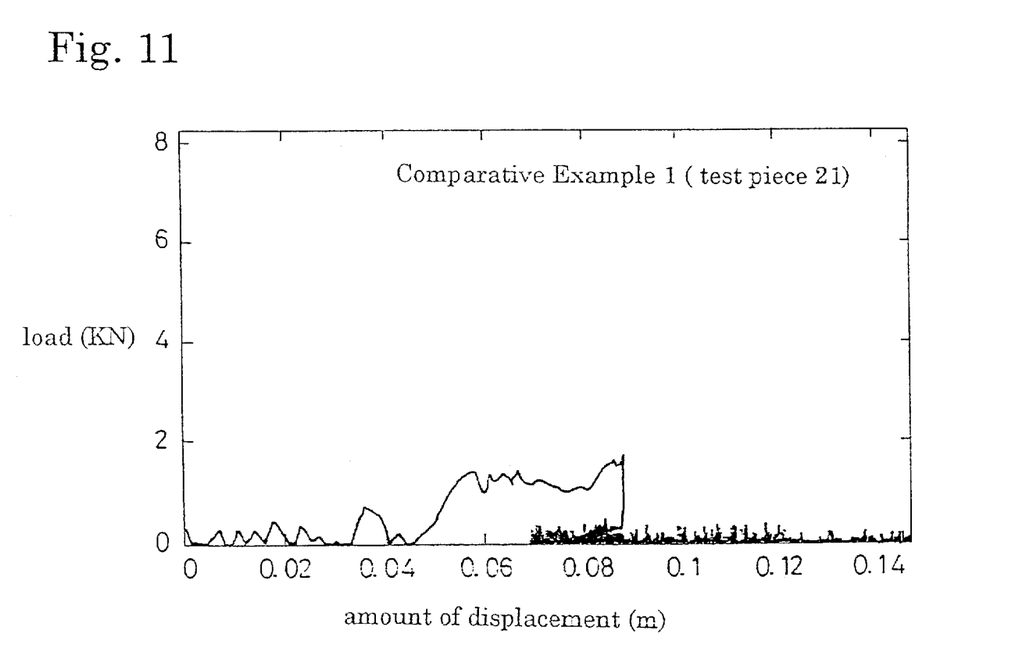
FIG. 11 is a graph showing test results of comparative example 1.
Figure 12:
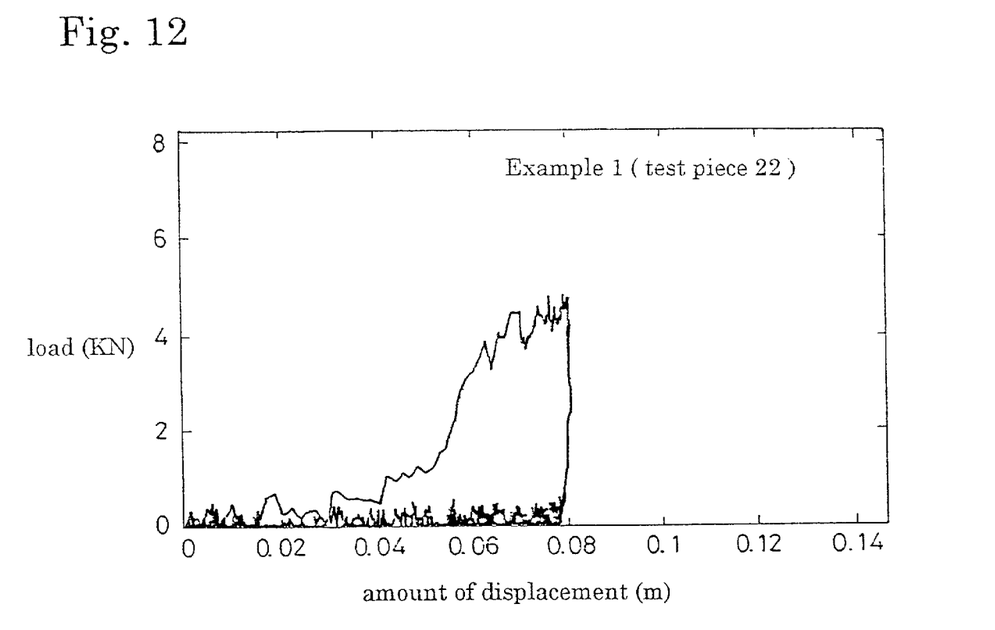
FIG. 12 is a graph showing test results of example 2.
Figure 13:
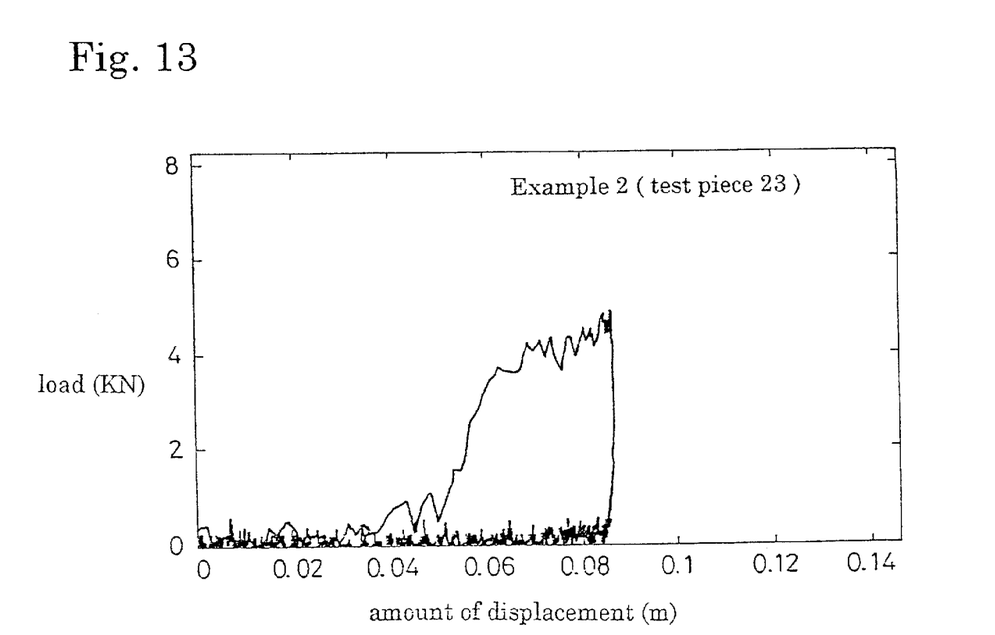
FIG. 13 is a graph showing test results of example 3.

As a result, as shown in FIG. 11, the non-reinforced test body 21 of comparative example 2 was only able to absorb a load of up to 1.5 kN due to shattering of the rigid polyurethane foam. As shown in FIGS. 12 and 13, when the reinforced test bodies 22 and 23 were used, the worsted felt prevented shattering of the rigid polyurethane foam and made it possible to sufficiently absorb an energy load of up to 5 kN.

As described in detail above, due to the reinforcing effect of the reinforcing material of the energy absorber of the present invention, even when the energy absorbing material breaks in a collision, it does not shatter, and consequently the energy absorber can sufficiently achieve the desired energy-absorption effects. Therefore, it is possible to provide an energy absorber with excellent passenger protection effects.

What is claimed is:

1. A shock absorber formed of a foam resin material, and having a compressing direction for compressing the shock absorber and a cross sectional area perpendicular to the compressing direction, said cross sectional area being at least partly changed along the compression direction and having a cross sectional shape with a substantial trapezoid in the compression direction so that a relation between distortion and compressive stress of the shock absorber in the compressing direction becomes substantially linear when a shock is applied to the shock absorber.

2. A shock absorber formed of a foam resin material, and having a compressing direction for compressing the shock absorber and a cross sectional area perpendicular to the compressing direction, said cross sectional area being at least partly changed along the compression direction, said shock absorber having a dip dipping in the compression direction so that a relation between distortion and compressive stress of the shock absorber in the compressing direction becomes substantially linear when a shock is applied to the shock absorber.

3. The shock absorber according to claim 2, wherein said absorber is a shock absorbing pad for use in a vehicle.

4. The shock absorber according to claim 2, wherein said foam resin material is a rigid polyurethane foam.

5. A shock absorber formed of a foam resin material, and having a compressing direction for compressing the shock absorber and a cross sectional area perpendicular to the compressing direction, said cross sectional area being at least partly changed along the compression direction, said shock absorber having a sloping portion diagonally intersecting the compression direction and an angle between the compression direction and the sloping with at least 15 degrees so that a relation between distortion and compressive stress of the shock absorber in the compressing direction becomes substantially linear when a shock is applied to the shock absorber.

6. The shock absorber according to claim 5, wherein said absorber is a shock absorbing pad for use in a vehicle.

7. The shock absorber according to claim 5, wherein said foam resin material is a rigid polyurethane foam.

8. A shock absorber according to claim 1, further comprising a reinforcing material attached to the foam resin material so that the foam resin material does not substantially shatter when a shock is applied thereto, said reinforcing material being formed of at least one material selected from a group consisting of worsted felt, cheesecloth, tufnel, metal sheet and resin sheet.

9. A shock absorber according to claim 2, further comprising a reinforcing material attached to the foam resin material so that the foam resin material does not substantially shatter when a shock is applied thereto, said reinforcing material being formed of at least: one material selected from a group consisting of worsted felt, cheesecloth, tufnel, metal sheet and resin sheet.

10. A shock absorber according to claim 5, further comprising a reinforcing material attached to the foam resin material so that the foam resin material does not substantially shatter when a shock is applied thereto, said reinforcing material being formed of at least one material selected from a group consisting of worsted felt, cheesecloth, tufnel, metal sheet and resin sheet.

11. The shock absorber according to claim 1, wherein said absorber is a shock absorbing pad for use in a vehicle.

12. The shock absorber according to claim 1, wherein said foam resin material is a rigid polyurethane foam.

13. The shock absorber according to claim 12, wherein the rigid polyurethane foam is formed by foaming a polyurethane foam raw material which comprises polyhydroxyl compounds and polyisocyanate compounds as main components, and further comprises, particles with an average diameter of 0.05 to 100 μm at a ratio of 1 to 200 weight per 100 weight of said hydroxyl compound.

14. The shock absorber according to claim 13, wherein said rigid polyurethane foam lacks a yield value in its stress-compression distortion curve when compressed at −30 to 100° C.

15. The shock absorber according to claim 13, wherein a foam stabilizer having surface tension of between 16 to 22 dyne/cm is mixed into the foam raw material.

16. The shock absorber according to claim 13, wherein foaming rate during foaming has a rise time of between 10 to 140 seconds.

17. The shock absorber according to claim 13, wherein said raw material is foamed with using water as a foaming agent.

18. The shock absorber according to claim 8, wherein the reinforcing material is affixed to a surface of the energy absorbing material by an adhesive.

19. The shock absorber according to claim 8, wherein the reinforcing material is joined to a surface of the energy absorbing material by one-shot foaming during manufacture of the energy absorbing material.

20. The shock absorber according to claim 8, wherein said absorber is for use inside a vehicle.

* * * * *